United States Patent
Berman et al.

(10) Patent No.: US 9,680,932 B2
(45) Date of Patent: Jun. 13, 2017

(54) LINEAR NETWORK CODING IN A DYNAMIC DISTRIBUTED FEDERATED DATABASE

(71) Applicant: INTERNATIONAL BUSINESS MACHINES CORPORATION, Armonk, NY (US)

(72) Inventors: Thomas J. C. Berman, London (GB); Stephen D. Pipes, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/509,638

(22) Filed: Oct. 8, 2014

(65) Prior Publication Data

US 2015/0106953 A1    Apr. 16, 2015

(30) Foreign Application Priority Data

Oct. 10, 2013    (GB) .................................. 1317944.5

(51) Int. Cl.
*H04L 9/08*    (2006.01)
*H04L 29/06*    (2006.01)
(Continued)

(52) U.S. Cl.
CPC .... *H04L 67/1097* (2013.01); *G06F 17/30566* (2013.01); *H04L 9/085* (2013.01); *H04L 63/18* (2013.01)

(58) Field of Classification Search
CPC ................................ H04L 9/085; H04L 63/18
See application file for complete search history.

(56) References Cited

U.S. PATENT DOCUMENTS 5,805,594 A * 9/1998 Kotchey ................ H04L 45/26
 370/255
6,031,835 A * 2/2000 Abali ................ H04Q 11/0414
 370/388
(Continued)

FOREIGN PATENT DOCUMENTS

EP  2043327  4/2009
EP  2106073  8/2010
(Continued)

OTHER PUBLICATIONS

Berman et al. "A Comparative Study on Trusted Path Discovery in Two Algorithms", pp. 1-2, IBM Watson Research, Pennsylvania State University, ACITA 2012; Sep. 18, 2012.
(Continued)

*Primary Examiner* — Dede Zecher
*Assistant Examiner* — Jason C Chiang
(74) *Attorney, Agent, or Firm* — Law Office of Jim Boice (57) ABSTRACT

A method, system and/or computer program product secures response data sent from a responder to a querier. Path information for query data is collected. The path information identifies paths from the querier to the responder and includes a physical machine identifier for each node hosted by a physical machine. One or more sets of return paths are identified for sending response data. For each set of return paths, any return paths that utilize any nodes sharing a physical machine identifier with any node present in another of the return paths within the set of return paths are discarded. The response data is split into a plurality of portions, and each of the plurality of portions is sent from the responder to the querier using a different return path selected from one of the set of return paths.

13 Claims, 5 Drawing Sheets

(51) Int. Cl.
*H04L 29/08* (2006.01)
*G06F 17/30* (2006.01)

(56) References Cited

U.S. PATENT DOCUMENTS

| | | | |
|---|---|---|---|
| 6,128,666 A | 10/2000 | Muller et al. | |
| 6,907,005 B1 | 6/2005 | Dahlman et al. | |
| 7,243,091 B2 | 7/2007 | Kalogeraki | |
| 7,680,130 B2 | 3/2010 | Ogawa | |
| 7,957,355 B1 | 6/2011 | Heiferling et al. | |
| 8,102,837 B2 | 1/2012 | Deb et al. | |
| 8,111,619 B2 | 2/2012 | Liu et al. | |
| 8,484,263 B2 | 7/2013 | Rosenberg | |
| 8,595,262 B1* | 11/2013 | Hayden | G06F 17/30545 370/252 |
| 2002/0004843 A1* | 1/2002 | Andersson | H04L 45/00 709/238 |
| 2003/0084020 A1 | 5/2003 | Shu | |
| 2004/0088393 A1 | 5/2004 | Bullen | |
| 2004/0215707 A1* | 10/2004 | Fujita | H04L 29/06 709/201 |
| 2006/0209720 A1* | 9/2006 | Nelson | H04L 45/02 370/254 |
| 2007/0050516 A1 | 3/2007 | Bona | |
| 2007/0060274 A1 | 3/2007 | Rowe | |
| 2007/0121635 A1 | 5/2007 | Zhou | |
| 2008/0056207 A1* | 3/2008 | Eriksson | H04L 12/66 370/338 |
| 2008/0083022 A1 | 4/2008 | Lee | |
| 2008/0137857 A1* | 6/2008 | Bellare | H04L 9/085 380/255 |
| 2008/0144504 A1* | 6/2008 | Marcondes | H04L 47/125 370/235 |
| 2008/0225751 A1 | 9/2008 | Kozat et al. | |
| 2008/0232390 A1 | 9/2008 | Nakata | |
| 2008/0294759 A1 | 11/2008 | Biswas | |
| 2009/0103550 A1* | 4/2009 | Miyata | H04L 12/427 370/400 |
| 2009/0135717 A1 | 5/2009 | Kamal et al. | |
| 2009/0252121 A1 | 10/2009 | Xia | |
| 2009/0254750 A1* | 10/2009 | Bono | H04L 63/0428 713/170 |
| 2009/0319519 A1 | 12/2009 | Sakakihara | |
| 2010/0189110 A1* | 7/2010 | Kambhampati | H04L 63/1458 370/400 |
| 2010/0257424 A1 | 10/2010 | Lau | |
| 2010/0262717 A1 | 10/2010 | Critchley | |
| 2010/0299313 A1* | 11/2010 | Orsini | H04L 9/085 707/652 |
| 2011/0243324 A1 | 10/2011 | Lima et al. | |
| 2012/0066249 A1* | 3/2012 | Hays | G06F 17/30433 707/769 |
| 2012/0221854 A1 | 8/2012 | Orsini et al. | |
| 2013/0107699 A1* | 5/2013 | Miclea | H04L 45/68 370/228 |
| 2013/0138893 A1 | 5/2013 | Maeda | |
| 2013/0195106 A1 | 8/2013 | Calmon | |
| 2014/0259107 A1* | 9/2014 | Buffington | H04L 63/12 726/3 |
| 2015/0106953 A1 | 4/2015 | Berman et al. | |
| 2015/0249587 A1* | 9/2015 | Kozat | H04L 43/10 370/222 |

FOREIGN PATENT DOCUMENTS

| | | |
|---|---|---|
| EP | 2037653 | 10/2012 |
| JP | 2005252846 | 9/2005 |
| WO | 02062032 | 8/2002 |
| WO | 2006047694 | 5/2006 |
| WO | 2008143652 A1 | 11/2008 |

OTHER PUBLICATIONS

Gerla et al. "An efficient weak secrecy scheme for network coding data dissemination in VANET", IEEE 19th International Symposium on Personal, Indoor and Mobile Radio Communications, 2008, PIMRC 2008, pp. 1-5.

Cai et al. "Secure Network Coding" Information Theory, 2002. Proceedings. 2002 IEEE International Symposium on Lausanne, Switzerland, Jun. 30-Jul. 5, 2002.

Lima et al. "Random Linear Network Coding: A free cipher?" Information Theory, 2007. ISIT 2007. IEEE International Symposium on, May 12, 2007.

Fragouli et al. "Network Coding: An Instant Primer," ACM SIGCOMM Computer Communication Review, vol. 36, No. 1, Jan. 2006.

Vilela et al. "Lightweight Security for Network Coding," Communications, 2008. ICC '08. IEEE International Conference.

Capar et al. "Network Coding for Facilitating Secrecy in Large Wireless Networks," IEEE, 46th Annual Conference on Information Sciences and Systems, 2012, pp. 1-6.

List of IBM Patents or Patent Applications Treated as Related—Oct. 3, 2014, pp. 1-2.

U.S. Appl. No. 13/887,873 Non-Final Office Action Mailed Jun. 22, 2016.

U.S. Appl. No. 13/887,873 Notice of Allowance Mailed Oct. 12, 2016.

* cited by examiner

FIG. 1

(Prior Art)

LINEAR NETWORK CODING IN A DYNAMIC DISTRIBUTED FEDERATED DATABASE

BACKGROUND

The present invention relates to linear network coding in a Dynamic Distributed Federated Database.

A federated database is one where a database engine is able to access local and remote sources of data as if the sources of data were contained in one logical database. A distributed database is one in which there are a number of database engines which are interconnected with each other. In a distributed federated database, queries may be performed by any of the interconnected database engines accessing any of the local or remote sources of data as if the sources of data were contained in one logical database. A query from any database engine propagates through the interconnected database engines and result sets from one or more of the sources of data are returned to the querying database engine. In a Dynamic Distributed Federated Database (DDFD) database engines may be dynamically added or removed in an ad hoc fashion whilst the database is in use.

A problem with allowing database engines to be added dynamically is that of providing confidentiality to the exchange of information in DDFDs, without also having to provide a mechanism for assessing the trustworthiness of a node. A further problem is the need to provide complex key management, which is commonly used in many modern confidentiality systems.

One particular problem faced in DDFDs is how to ensure that when data is being passed through the network, it is not readable by an unauthorized party. Data leakage can occur by an attacker owning or compromising a node in the data path or by 'wire sniffing' a link between nodes.

Figure 1:
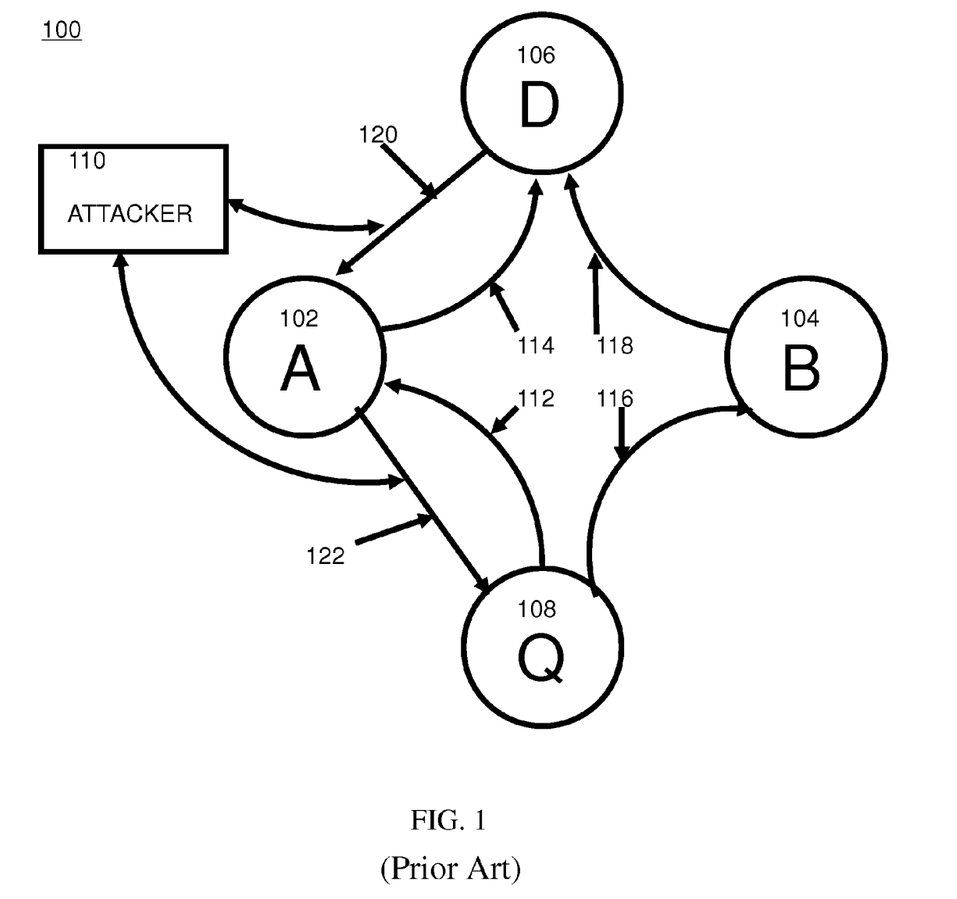
FIG. 1 shows a prior art Dynamic Distributed Federated Database (DDFD) in which data flowing along one or more links between nodes is vulnerable to an attacker.

FIG. 1 shows a prior art DDFD 100 having four nodes, A 102, B 104, D 106 and Q 108. In the example of FIG. 1, data node Q 108 is asking for some data, typically in the form of an SQL query, the data residing on node D 106. At the time of asking for the data, node Q 108 does not know that the data resides on node D 106. As the query is broadcast, it passes 112 from node Q 108 through 114 node A 102 to node D 106 and also passes 116 from node Q 108 through 118 node B 104 to node D 106. Nodes A 102 and B 104 examine the query and pass it on, adding metadata to the query. When the query arrives at node D 106, node D 106 understands that it wishes to answer the query and return the data to node Q 108.

Node D 106 returns 120 the data to node A 102, which forwards 122 the data to node Q 108. Attacker 110 can intercept the data flowing 120 between node D 106 and node A 102 as well as the data flowing 122 between node A 102 and node Q 108. Data flowing between these nodes is vulnerable to interception. In addition, node A 102 may intercept the data, which may not be desirable if node A 102 is an untrusted node.

In static networks an approach that is used is to encrypt the data, so that only the nodes that have the appropriate keys can read the data. This is a well understood and implemented concept. However, in dynamic networks, where nodes leave and join the network in an ad hoc fashion, the overhead of key distribution and revocation of keys is problematic. It would be desirable to protect data 'in flight' through the network without the overhead and complexity of key based encryption.

Known prior art discloses a method in which a data message is secured in a two stage process such that at least a first portion of the plurality of fragments is transported along a first communication path of the network and at least a second portion of the plurality of fragments is transported along a second communication path of the network. Encryption is still used to secure the data and so there are still problems of key distribution and revocation of keys. Although different portions of the plurality of fragments are transported along different communication paths, portions of the different communication paths may use one or more common segments.

Known prior art discloses a secure data parser which splits the data to be secured into two or more portions. Encryption of the data may be done before or after the splitting of the data. Also disclosed is the sending of different portions of the data along different paths thus creating multiple streams of data. Although the data is sent along different paths, portions of the different paths may use one or more common segments.

SUMMARY

In one embodiment of the present invention, a method and/or computer program product secure response data sent from a responder to a querier. Path information for query data is collected. The path information identifies paths from the querier to the responder and includes a physical machine identifier for each node hosted by a physical machine. One or more sets of return paths are identified for sending response data. For each set of return paths, any return paths that utilize any nodes sharing a physical machine identifier with any node present in another of the return paths within the set of return paths are discarded. The response data is split into a plurality of portions, and each of the plurality of portions is sent from the responder to the querier using a different return path selected from one of the set of return paths.

In one embodiment of the present invention, a hardware system for use by a distributed federated database for securing response data sent from a responder to a querier, in response to query data sent from a querier through one or more nodes of a network of nodes, hosted on a physical machine, to a responder, comprises: hardware means for collecting path information for the query data, the path information identifying a plurality of paths from the querier to the responder and including a physical machine identifier for each of the nodes; hardware means for identifying one or more sets of return paths, from said plurality of paths, for sending response data, each one of the return paths within an identified set of return paths utilizing only a subset of nodes not present in any other one of the return paths within the identified set of return paths; hardware means for, for each of said one or more set of return paths, discarding any of the return paths within the set of return paths which utilize any nodes sharing a physical machine identifier with any node present in another of the return paths in the set of return paths; and hardware means for splitting the response data into a plurality of portions and sending each of the plurality of portions from the responder to the querier using a different return path selected from one of said set of return paths.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
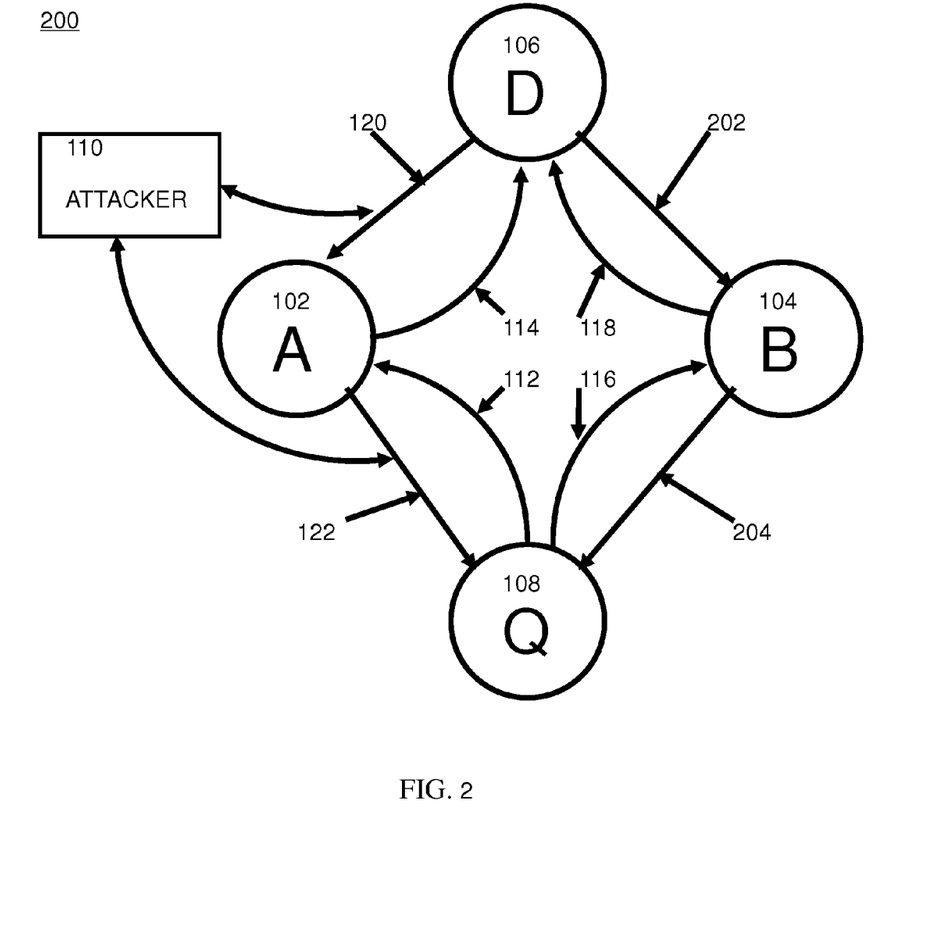
FIG. 2 shows an improved DDFD in which data is distributed amongst a plurality of paths so that vulnerability of one or more links between nodes does not result in leakage of data.

FIG. 2 shows an improved Dynamic Distributed Federated Database (DDFD) 100 having four nodes, A 102, B 104, D 106 and Q 108. In the example of FIG. 2, data node Q 108 is asking for some data, typically in the form of an SQL query, the data residing on node D 106. At the time of asking for the data, node Q 108 does not know that the data resides on node D 106. As the query is broadcast, it passes 112 from node Q 108 through 114 node A 102 to node D 106 and also passes 116 from node Q 108 through 118 node B 104 to node D 106. Nodes A 102 and B 104 examine the query and pass it on, adding metadata to the query. When the query arrives at node D 106, node D 106 understands that it wishes to answer the query and return the data to node Q 108.

Node D 106 returns 120 only a portion of the data to node A 102, which forwards 122 the portion of the data to node Q 108. Attacker 110 can intercept the portion of the data flowing 120 between node D 106 and node A 102 as well as the portion of the data flowing 122 between node A 102 and node Q 108. The portion of the data flowing between these nodes is vulnerable to interception. In addition, node A 102 may intercept the portion of the data, which may not be desirable if node A 102 is an untrusted node. However, the intercepted portion is not the entirety of the data response from node D 106 to node Q 108, so neither node A 102, nor the attacker 110 intercept the entirety of the data, only the portion flowing 120, 122 through node A 102.

Node D 106 also returns 202 another portion of the data to node B 104, which forwards 204 the another portion of the data to node Q 108. Attacker 110 does not intercept the another portion of the data flowing 202 between node D 106 and node B 104 as well as the another portion of the data flowing 204 between node B 104 and node Q 204. The portion of the data flowing between these nodes is not intercepted by the attacker 110. In addition, node B 104 may intercept the portion of the data, which may not be desirable if node B 104 is an untrusted node. However, the intercepted portion is not the entirety of the data response from node D 106 to node Q 108, so node B 104 does not intercept the entirety of the data, only the portion flowing 202, 204 through node B 104.

The approach of FIG. 2 is inspired by network coding, that is splitting the data into n portions so that only in the presence of all n portions can the data response be decoded. This removes the overhead associated with managing encryption keys. It also means that as any single node cannot see all the data, there are no concerns about the affiliation of any single node. This lack of concern about the affiliation of any single node is subject to the caveat that it is necessary to know something of the physical properties of the DDFD.

It is necessary to know something of the physical properties, such as network paths of the query received at node D 106, of the DDFD in order to ensure confidentiality. The nodes in a DDFD are logical constructs, of which several could be running on the physical same machine or in instances of different virtual machines running on a single physical machine. This is a security vulnerability as an attacker or any node reading the data passing through the network interfaces on a single physical machine (e.g. virtual machine host) can reconstruct the data. In the example of FIG. 2, if node A 102 and node B 104 were each separate logical nodes running on a single physical machine, then an attacker 110 or any untrusted node may reconstruct the data from the two portions of data returned through the two separate network paths passing through node A 102 and node B 104.

Figure 3:
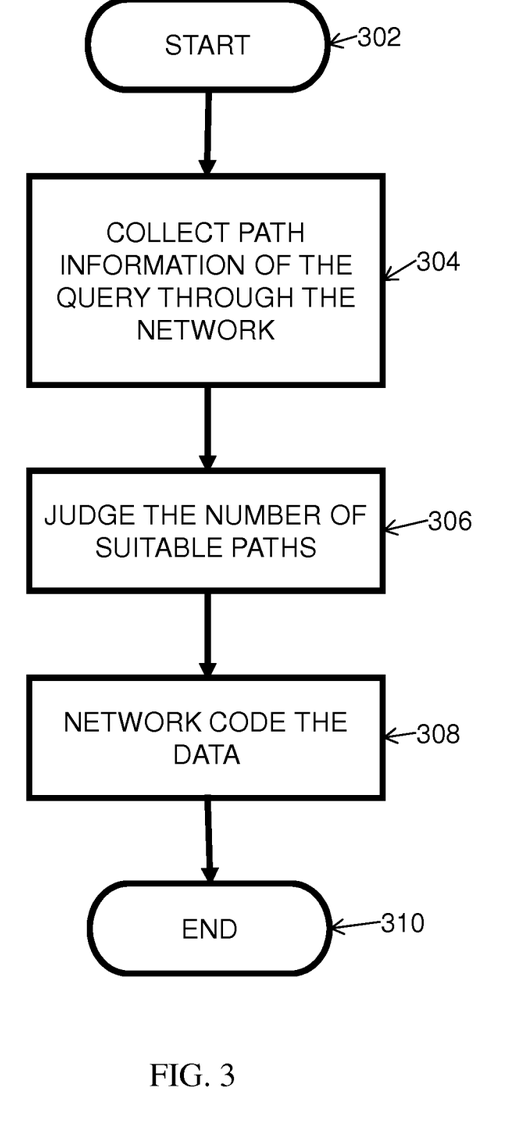
FIG. 3 shows a flow chart of an embodiment of a method according to the present invention.

FIG. 3 shows a flow chart of an embodiment of a method according to the present invention. The method starts at step 302. At step 304, the path information of the incoming query through the network is collected by the responding node, node D 106. This may be done by node D 106 itself or it may be done by an entity that node D 106 trusts if that entity has a view of the entire network path. The path information of the incoming query is obtained from the metadata associated with the incoming query, which shows the route taken by that query. In alternative embodiments, the path information may be obtained from a metadata store, such as a centralized database, as long as there is a strong binding to the query, for example, by the use of global query ids.

At step 306, node D 106 judges the number of suitable paths for the return of the data response to the query. Again, this may be done by node D 106 itself or it may be done by an entity that node D 106 trusts. Embodiments of step 306 are described in more detail below with reference to FIGS. 4 and 5. At step 308, the data response is network coded to ensure that privacy of the data is preserved whilst the data is being sent from node D 106 to node Q 108. The embodiment of the method ends at step 310.

In order to ensure that two nodes running on the same physical machine or in instances of different virtual machines running on a single physical machine are not used in different return paths a unique physical machine identifier is used in the metadata of the query. Table 1 below shows the metadata associated with a data response to an SQL query. The SQL query is "Call listconfig( )". The results include the property ID (PROPID) and the property definition (PROPDEF). One of the items of metadata is a nodeID, shown in the table below as DNODEID, and attached to the metadata of each query passing through or arriving at a node. This nodeID may be a string set by a user, or it may be set by the DDFD software and associated with a particular physical machine using, for example, a Trusted Computer Platform code or other codes that uniquely identify the physical machine. In an embodiment it may be a hardware id from a Trusted Partner Module (TPM). Access to the TPM may be obtained using a conventional Java® library.

SQL Query: call listconfig( )

TABLE 1

Metadata associated with a data response to an SQL query

| Results: PROPID | PROPDEF |
|---|---|
| #NETWORK_DRIVER_GDBUDP_SOCKET_BUFFER_SIZE | 64000 |

TABLE 1-continued

Metadata associated with a data response to an SQL query

Results:

| PROPID | PROPDEF |
|---|---|
| #NETWORK_DRIVER_GDBUDP_TIMEOUT | 5000 |
| ACCESS_CLUSTERS | TOM |
| ALLOW_PROPAGATED_WRITES | TRUE |
| ALLOW_SQL_API_CONFIGURATION | TRUE |
| C0_DNODEID | A:6415 |
| C0_DRIVER | org.apache.derby.jdbc.ClientDriver |
| C0_HYPER | |
| C0_LAST_CHECKED_TIME | 1359125506517 |
| C0_PWD | <pwd> |
| C0_URL | jdbc:derby://9.180.165.218:6415/gaiandb6415;create=true |
| C0_USR | gaiandb |
| C1_DNODEID | Data:6417 |
| C1_DRIVER | org.apache.derby.jdbc.ClientDriver |
| C1_HYPER | |
| C1_LAST_CHECKED_TIME | 1359125506654 |
| C1_PWD | <pwd> |
| C1_URL | jdbc:derby://1.20.165.218:6417/gaiandb6417;create=true |
| C1_USR | gaiandb |
| DB2_DRIVER | com.ibm.db2jcc.DB2Driver |

As can be seen in table 1, node C0 with a NODEID of A:6415 has a url of jdbc:derby://180.9.165.218:6415/gaiandb6415 and node C1 has a url of jdbc:derby://180.9.165.218:6417/gaiandb6417. Both urls refer to the same physical machine having the same unique machine identifier, that is the physical machine having an IP address of 180.9.165.218. The machine identifier is associated with a routing data model in route information in the database by adding it as an additional attribute.

Known prior art, discloses a wireless secrecy capacity scaling problem where the question of interest is how much information can be shared among n randomly located nodes such that the throughput is kept information-theoretically secure from m eavesdroppers also present in the network. In a 1-D network, n nodes can share a per-node throughput that scales as 1/n which can be kept secure from m randomly located eavesdroppers of unknown location as long as m grows more slowly than n/log n. For a 2-D network, the per-node secure throughput scales as 1/{(n log n) for any number of eavesdroppers of unknown location which could be arbitrarily located inside this network.

Figure 4:
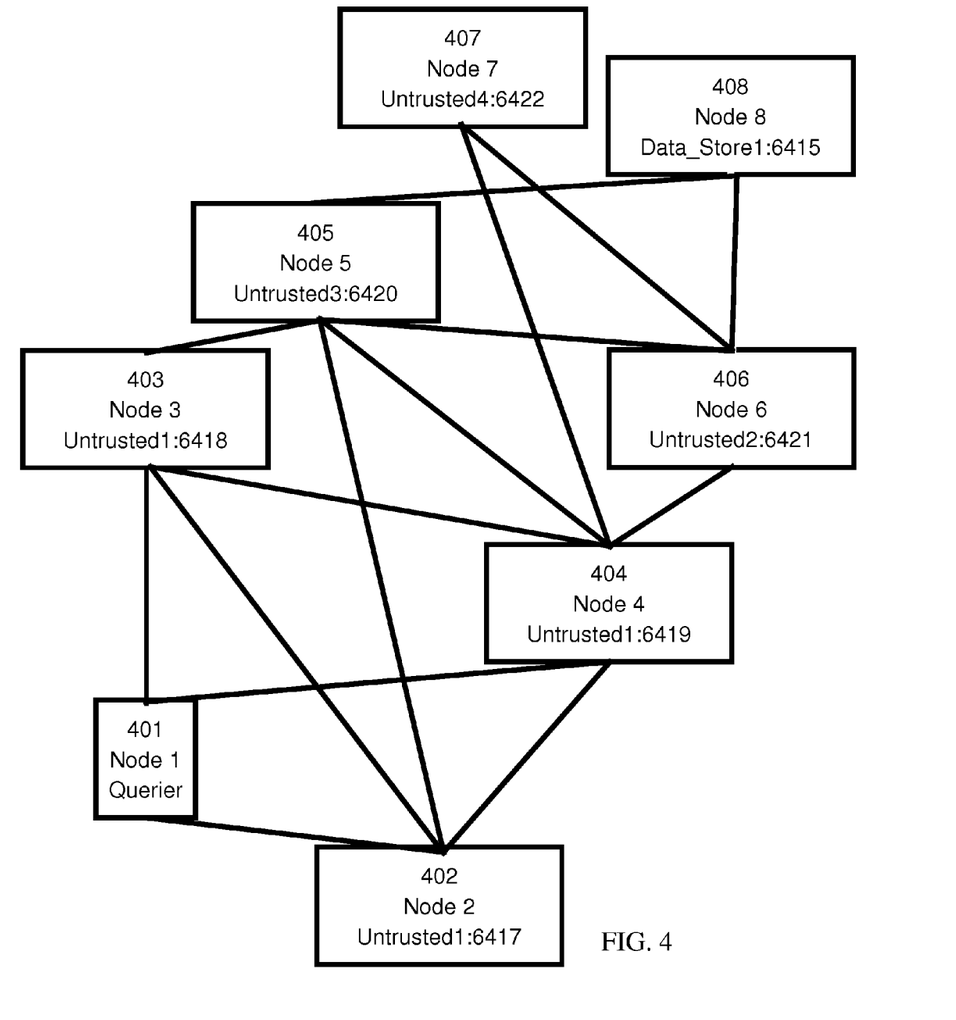
FIG. 4 shows a database network having nodes and links in which embodiments of the present invention may be implemented.

FIG. 4 shows an implementation of a network with each node 401-408 represented by a rectangle. Each node has a logical node name, such as Untrusted4:6422, shown inside the rectangle, and a physical node ID (such as Node 1 to Node 8) added for the purposes of illustration. The physical node IDs are extracted from the physical machine on which the node resides and are associated with the node as a node attribute on the data model.

Figure 5:
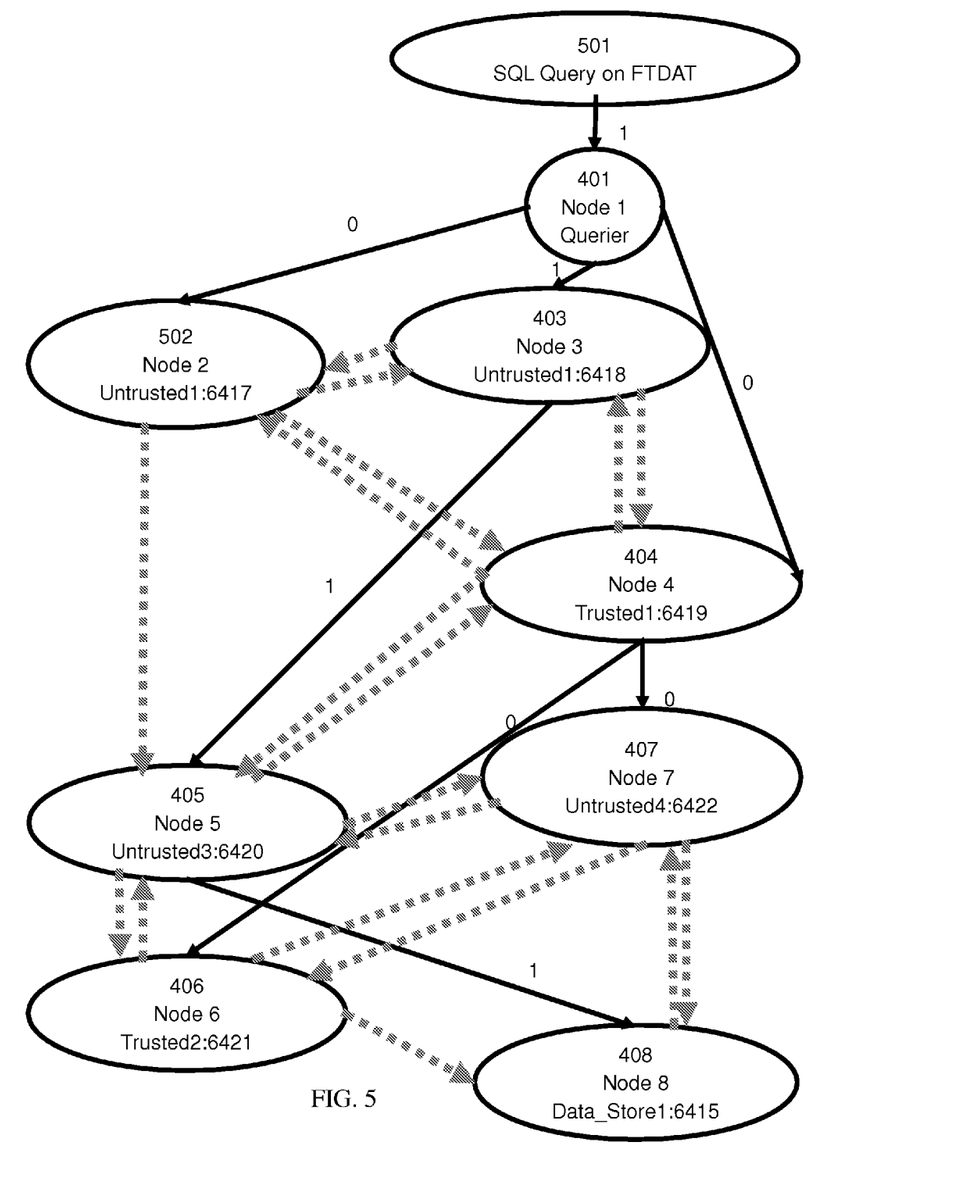
FIG. 5 shows a route taken between nodes through links according to an embodiment of the present invention.

FIG. 5 shows the route taken by a query (from the querier Node 1 401) as links (numbered 1) between nodes in the network to the endpoint Node 8 408. A DDFD optimizes route selection using a cross-talk mechanism whereby neighboring nodes are contacted during query propagation. FIG. 5 shows two aspects of this cross-talk mechanism: firstly, that a route has been found, the links numbered 1, and that other routes may exist, the links numbered 0, and secondly how the cross-talk mechanism interacts with neighboring nodes. The dotted lines show how the DDFD optimizes query propagation by removing duplication if a query has previously (within the context of the query session) propagated to a given node. Thus, dotted lines show propagation optimization. This second aspect is known to the person skilled in the art and is essentially a core mechanism of the DDFD. The route goes from the querier Node 1 401 to Node 3 403 to Node 5 405 to Node 8 408. To respond to the request, the endpoint node, Node 8 408, has the choice of at least the following exemplary return paths:

1: Node 8, Node 6, Node 4, Node 3, Node 1;
2: Node 8, Node 6, Node 5, Node 2, Node 1;
3: Node 8, Node 5, Node 3, Node 1;
4: Node 8, Node 7, Node 4, Node 1;
5: Node 8, Node 7, Node 4, Node 3, Node 1,
6: Node 8, Node 5, Node 2, Node 1, As described above, in an embodiment of the invention, data portions forming the data response are returned from node D 106 to node Q 108 using at least two different return paths contained in a set of return paths. In the example below, it is assumed that each set contains two data return paths. In other embodiments, sets may contain more than two return paths. The return paths, such as the exemplary return paths identified above, are evaluated, starting with a first return path.

1: Node 8, Node 6, Node 4, Node 3, Node 1—PERMIT;
2: Node 8, Node 6, Node 5, Node 2, Node 1—DO NOT PERMIT (Node 6 shared with return path 1, so if return path 2 is used together with return path 1 for two separate portions of data, then both portions of the data response pass through the single node 6);
3: Node 8, Node 5, Node 3, Node 1—DO NOT PERMIT (Node 3 shared with return path 1, so if return path 3 is used together with return path 1 for two separate portions of data, then both portions of the data response pass through the single node 3);
4: Node 8, Node 7, Node 4, Node 1—DO NOT PERMIT (Node 4 shared with return path 1, so if return path 4 is used together with return path 1 for two separate portions of data, then both portions of the data response pass through the single node 4);
5: Node 8, Node 7, Node 4, Node 3, Node 1—DO NOT PERMIT (Node 4 shared with return path 1, so if return path 5 is used together with return path 1 for two separate portions of data, then both portions of the data response pass through the single node 4); and 6: Node 8, Node 5, Node 2, Node 1—PERMIT, (No intermediate nodes shared with return path 1).

So in the exemplary paths identified above, return path 1 and return path 6 may be used together in a set to return two separate portions of the results data. Return path 2 and return path 4 could also be used together in a set to return two separate portions of the results data as could return paths 2 and 5, return paths 3 and 4, return paths 4 and 6 and return paths 5 and 6. In the exemplary paths identified above, no set of three return paths not sharing a node exists. In an example not corresponding to FIGS. 4 and 5, a return path using node 408, node 406, node 403, node 401 could be combined with return path 4 and return path 6 to create a set of three return paths.

The "PERMIT"ed return paths, that is the 6 listed in the previous paragraph for this example, are then validated against each of the nodes in the routing data model in the route information in the database, looking for instances of nodes that would invalidate the security properties, for example, where nodes having the same machine identifier are used by more than one return route.

Once two or more valid return paths have been identified, the data response is split into portions according to Network Coding principles and the portions of the data response are sent over valid return paths only.

Node 8 408 is the single node that evaluates the permissible return paths. If one of the intermediate nodes in one of the chosen return paths disappears (due to the dynamic nature of the network) then the return path containing that node is identified as no longer being available. In "optimal" configurations the interconnections between nodes in the network contain many unique return paths and so a different one of those return paths is identified to substitute for the one that contains the node that is no longer available.

A first return path between Node 8 408 and Node 1 401, used for returning a first portion of the data response, preferably contains no node intersections with a second return path between Node 8 408 and Node 1 401, used for returning a second portion of the data response. However, in an embodiment, in order to improve network utilization characteristics, one or more intersections may be permitted. An effective routing algorithm needs to balance data security, that is confidentiality, with network performance, for example, throughput. Prior art network coding methods optimize the performance of the network, network coding methods according to the present invention optimize primarily data security, with some consideration of network performance.

A particular query may be satisfied by multiple nodes contributing partial responses to the query result. The partial responses may be returned to the querying node separately by each of the nodes contributing the partial responses or the partial responses may be merged at a node contributing a partial response. If the partial responses are returned to the querying node separately by each of the nodes contributing the partial responses, then each of the nodes contributing the partial responses chooses the return paths from itself to the querier. If the partial responses are merged at a node contributing a partial response, then the node at which the partial responses are merged to form a complete response chooses the return paths from itself to the querier.

Embodiments of the invention provide a method for use in a distributed federated database for securing response data sent from a responder to a querier, in response to query data sent from a querier through one or more nodes of a network of nodes, hosted on a physical machine, to a responder, the method comprising the steps of: collecting path information for the query data, the path information identifying a plurality of paths from the querier to the responder and including a physical machine identifier for each of the nodes; identifying one or more sets of return paths, from said plurality of paths, for sending response data, each one of the return paths within an identified set of return paths utilizing only a subset of nodes not present in any other one of the return paths within the identified set of return paths; for each of said one or more set of return paths, discarding any of the return paths within the set of return paths which utilize any nodes sharing a physical machine identifier with any node present in another of the return paths in the set of return paths; and splitting the response data into a plurality of portions and sending each of the plurality of portions from the responder to the querier using a different return path selected from one of said set of return paths.

In a preferred embodiment, the distributed federated database is a dynamic distributed federated database in which queriers, nodes and responders may be added whilst the dynamic distributed federated database is in use.

In a preferred embodiment, said path information is collected from metadata added by each of the one or more nodes as the query data passes through each of the one or more nodes.

In an embodiment, the response data comprises a partial response to the query data.

Embodiments of the invention also provide a system for use in a distributed federated database for securing response data sent from a responder to a querier, in response to query data sent from a querier through one or more nodes of a network of nodes, hosted on a physical machine, to a responder, the method comprising the steps of: means for collecting path information for the query data, the path information identifying a plurality of paths from the querier to the responder and including a physical machine identifier for each of the nodes; means for identifying one or more sets of return paths, from said plurality of paths, for sending response data, each one of the return paths within an identified set of return paths utilizing only a subset of nodes not present in any other one of the return paths within the identified set of return paths; means for, for each of said one or more set of return paths, discarding any of the return paths within the set of return paths which utilize any nodes sharing a physical machine identifier with any node present in another of the return paths in the set of return paths; and means for splitting the response data into a plurality of portions and sending each of the plurality of portions from the responder to the querier using a different return path selected from one of said set of return paths.

Embodiments of the invention further provide a computer program product for use in a distributed federated database for securing response data sent from a responder to a querier, in response to query data sent from a querier through one or more nodes of a network of nodes, hosted on a physical machine, to a responder, the computer program product comprising: a computer readable storage medium having computer readable program code embodied therewith, the computer readable program code adapted to perform the methods described above when said program is run on a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in a distributed federated database for securing response data sent from a responder to a querier, in response to query data sent from a querier through one or more nodes of a network of nodes, hosted on a physical machine, to a responder, the method comprising:
collecting, by one or more processors, path information for the query data, wherein the path information identifies a query path from a querier node to a responder node, wherein the path information includes a physical machine identifier for each of one or more nodes in the query path, wherein each physical machine identifier is a hardware identifier for a physical machine used for each of the one or more nodes in the query path;
identifying, by one or more processors, a plurality of return paths for sending response data from the responder node to the querier node, wherein each one of the return paths from the plurality of return paths utilizes only a subset of nodes not present in any other one of the return paths within the plurality of return paths, and wherein the response data comprises a partial response to the query data;
for each of said plurality of return paths, discarding, by one or more processors, any return paths within the plurality of return paths which utilize any nodes sharing the physical machine identifier with any node present in another of the plurality of return paths, wherein a discarded return path is unavailable as a return path from the responder node to the querier node; and
splitting, by one or more processors, the response data into a plurality of portions and sending each of the plurality of portions from the responder node to the querier node using a different return path selected from one of said plurality of return paths that have not been discarded for having nodes that share the physical machine identifier for the same physical machine, wherein each return path from the plurality of return paths shares at least one intermediate node with the query path, and wherein each return path from the plurality of return paths contains at least one intermediate node that is not in the query path.

2. The method as claimed in claim 1, wherein the distributed federated database is a dynamic distributed federated database in which queriers, nodes and responders are capable of being added while the dynamic distributed federated database is in use.

3. The method as claimed in claim 1, wherein said path information is collected from metadata added by each of the one or more nodes as the query data passes through each of the one or more nodes.

4. The method as claimed in claim 1, wherein a first return path from the plurality of return paths is initially used to return a portion of the response data to the querier node from the responder node, and wherein the method further comprises:
detecting, by the responder node, that an intermediate node from the first return path has disappeared; and
in response to the responder node detecting that the intermediate node from the first return path has disappeared, selecting, by one or more processors, a second return path from the plurality of return paths to replace the first return path.

5. The method of claim 1, further comprising:
restoring, by one or more processors, two of the discarded return paths as restored return paths in which a shared intermediate node is used;
merging, by one or more processors, partial responses from the two restored return paths at the shared intermediate node to create a complete response; and
choosing, by the shared intermediate node, a return path through which the complete response is transmitted from the shared intermediate node to the querier node.

6. A hardware system for use by a distributed federated database for securing response data sent from a responder to a querier, in response to query data sent from a querier through one or more nodes of a network of nodes, hosted on a physical machine, to a responder, the hardware system comprising:
hardware means for collecting path information for the query data, the path information identifying a plurality of paths from the querier to the responder and including a physical machine identifier for each of the nodes in the query path, wherein each physical machine identifier is a hardware identifier for a physical machine used for each of the one or more nodes in the query path;
hardware means for identifying a plurality of return paths for sending response data from the responder node to the querier node, each one of the return paths within the plurality of return paths utilizing only a subset of nodes not present in any other one of the plurality of return paths, and wherein the response data comprises a partial response to the query data;
hardware means for, for each of said plurality of return paths, discarding any of the return paths within the plurality of return paths which utilize any nodes sharing a physical machine identifier with any node present in another of the return paths in the plurality of return paths, wherein a discarded return path is unavailable as a return path from the responder node to the querier node; and
hardware means for splitting the response data into a plurality of portions and sending each of the plurality of portions from the responder to the querier using a different return path selected from one of said plurality of return paths that have not been discarded for having nodes that share the physical machine identifier for the same physical machine, wherein each return path from the plurality of return paths shares at least one intermediate node with the query path, and wherein each return path from the plurality of return paths contains at least one intermediate node that is not in the query path.

7. The hardware system as claimed in claim 6, wherein the distributed federated database is a dynamic distributed federated database in which queriers, nodes and responders are added while the dynamic distributed federated database is in use.

8. The hardware system as claimed in claim 6, wherein said hardware means for collecting path information collect metadata added by each of the one or more nodes as the query data passes through each of the one or more nodes.

9. The hardware system as claimed in claim 6, wherein the response data comprises a partial response to the query data.

10. A computer program product for use in a distributed federated database for securing response data sent from a responder to a querier, in response to query data sent from a querier through one or more nodes of a network of nodes, hosted on a physical machine, to a responder, the computer program product comprising a computer readable storage device, wherein the computer readable storage device is hardware having program code thereupon, the program code readable and executable by a processor to perform a method comprising:

collecting path information for the query data, wherein the path information identifies a plurality of paths from the querier to the responder and includes a physical machine identifier for each of the one or more nodes in the query path, wherein each physical machine identifier is a hardware identifier for a physical machine used for each of the one or more nodes in the query path;

identifying a plurality of return paths, from said plurality of paths, for sending response data, wherein each one of the return paths from the plurality of return paths utilizes only a subset of nodes not present in any other one of the return paths within the plurality of return paths, and wherein the response data comprises a partial response to the query data;

for each of said plurality of return paths, discarding any return paths within the plurality of return paths which utilize any nodes sharing a physical machine identifier with any node present in another of the plurality of return paths, wherein a discarded return path is unavailable as a return path from the responder node to the querier node; and splitting the response data into a plurality of portions and sending each of the plurality of portions from the responder to the querier using a different return path selected from one of said plurality of return paths that have not been discarded for having nodes that share the physical machine identifier for the same physical machine, wherein each return path from the plurality of return paths shares at least one intermediate node with the query path, and wherein each return path from the plurality of return paths contains at least one intermediate node that is not in the query path.

11. The computer program product of claim 10, wherein the distributed federated database is a dynamic distributed federated database in which queriers, nodes and responders are capable of being added while the dynamic distributed federated database is in use.

12. The computer program product of claim 10, wherein said path information is collected from metadata added by each of the one or more nodes as the query data passes through each of the one or more nodes.

13. The computer program product of claim 10, wherein the response data comprises a partial response to the query data.

* * * * *